US005243023A

United States Patent [19]
Dezern

[11] Patent Number: 5,243,023
[45] Date of Patent: Sep. 7, 1993

[54] POLYIMIDES CONTAINING AMIDE AND PERFLUOROISOPROPYLIDENE CONNECTING GROUPS

[75] Inventor: James F. Dezern, Poquoson, Va.

[73] Assignee: The United States of America as represented by the Administrator of the National Aeronautics and Space Administration, Washington, D.C.

[21] Appl. No.: 752,246

[22] Filed: Aug. 28, 1991

[51] Int. Cl.$^5$ .................. C08G 69/32; C08G 73/10
[52] U.S. Cl. ........................... 528/331; 528/28; 528/41; 528/310; 528/353
[58] Field of Search ............. 528/331, 310, 353, 28, 528/41

[56] References Cited

U.S. PATENT DOCUMENTS

| | | | |
|---|---|---|---|
| 3,179,635 | 4/1965 | Frost et al. | 528/353 |
| 4,684,714 | 8/1987 | Lubowitz et al. | 528/353 |
| 4,847,353 | 7/1989 | Watanabe | 528/184 |
| 4,851,495 | 7/1989 | Sheppard et al. | 528/170 |
| 4,981,922 | 1/1991 | Sheppard et al. | 525/422 |
| 5,011,905 | 4/1991 | Lubowitz et al. | 528/170 |
| 5,104,967 | 4/1992 | Sheppard et al. | 528/322 |
| 5,175,234 | 12/1992 | Lubowitz et al. | 528/173 |

Primary Examiner—Harold D. Anderson
Attorney, Agent, or Firm—George F. Helfrich

[57] ABSTRACT

New, thermooxidatively stable polyimides have been prepared from the reaction of aromatic dianhydrides containing isopropylidene bridging groups with aromatic diamines containing amide connecting groups between the rings. Several of these polyimides were shown to be semi-crystalline as evidenced by wide angle xray scattering and differential scanning calorimetry. Most of the polyimides form tough, flexible films with high tensile properties. These polyimide films exhibit enhanced solubility in organic solvents.

11 Claims, No Drawings

POLYIMIDES CONTAINING AMIDE AND PERFLUOROISOPROPYLIDENE CONNECTING GROUPS

ORIGIN OF THE INVENTION

The invention described herein was made by and employee of the U.S. Government and may be manufactured and used by or for the Government for government purposes without the payment of any royalties thereon or therefor.

BACKGROUND OF THE INVENTION

1. Field of the Invention

This invention relates generally to high temperature polymers. In particular it relates to new polyimides formed from the reaction of aromatic dianhydrides containing isopropylidene connecting group between the aromatic rings with asymmetric amide diamines, whereby soluble, high strength, thermo-oxidatively stable, semicrystalline polyimides are obtained.

2. Description of the Related Art

Polyimides are condensation type polymers commonly synthesized by the reaction of aromatic diamines with aromatic dianhydrides. The intermediate polyamide-acid is either thermally or chemically dehydrated to form a polyimide which has a repeat unit of the general type

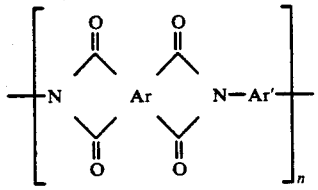

where Ar is a suitable tetravalent aromatic radical which may be as simple as 1,2,4,5-tetrasubstituted benzene or a more complex structure having the general structure:

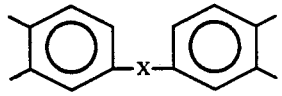

where X is a bond or is a member selected from the group consisting of O, S, $SO_2$, C=O, and $C(CH_3)_2$, or Ar may be any other appropriate tetravalent radical; and where Ar' is a divalent aromatic organic radical.

Synthesis and characterization of polyimides has been extensively reported in the literature. The preparation of wholly aromatic polyimides by reaction of an aromatic dianhydride with an aromatic diamine, followed by thermal cyclization was first reported in 1963 [G. M. Bower and L. W. Frost, *Journal of Polymer Science*, A1, 3135(1963)]. Several reviews on polyimides have been published [C. E. Sroog, "Polyimides" in *Encyclopedia of Polymer Science and Technology*, (H. F. Mark, N. G. Gaylord, and N. M. Bikales, Ed.), Interscience Publishers, New York, 1969, Vol. 11, pp. 247–272; N. A. Adrova, M. I. Bessonov, L. A. Laius, and A. P. Rudakov, *Polyimides*, Technomic Publishing Co., Inc., Stamford, Conn., 1970; and D. Wilson, H. D. Stenzenberger, and P. M. Hergenrother, Ed., *Polyimides*, Blackie and Son, Ltd., London, 1990].

Polyimides heretofore known to the art are generally extremely insoluble after conversion from the polyamide-acid state to the polyimide form. Polyamide-imides with a carbonyl bridge in the dianhydride portion have been reported to be insoluble in organic solvents [J. F. Dezern, *Journal of Polymer Science*, A, 26, 2157(1988)]. As reported by F. W. Harris and L. H. Lanier in *Structure-Solubility Relationships in Polymers*, (F. W. Harris and R. B. Seymour, ed.), Academic Press, New York, pp. 183–198 (1977), a flexible linkage, such as a perfluoroisopropyl group in the dianhydride portion of the polymer improves the solubility characteristics of the polyimides. However, asymmetry in the connecting groups was not comprehended.

A primary object of the present invention is to provide soluble polyimides which can be dissolved in certain solvents and the solutions can be characterized and employed for further fabrication of the polyimides. In this way, polyimide films, coatings and the like can be produced without the necessity of using a polyamideacid intermediate with a follow-on conversion step. This is highly advantageous, because it permits the application of polyimide coatings to articles which might be damaged by heating or chemical conversion techniques.

Another object of the present invention is to provide high molecular weight polyamide-acid solutions that yield optically transparent, creasable, free-standing films and coatings in the fully cured form.

Another object of the present invention is to provide fully cured polyimide films with enhanced solubility in common organic solvents such as N,N-dimethylacetamide (DMAc) and N-methylpyrrolidone (NMP).

Another object of the present invention is to provide high temperature stable aromatic polyimides which exhibit improved thermooxidative stability.

Another object is to provide polyimides that form well-consolidated moldings.

A further object is to provide polyimide films that exhibit high glass transition temperatures (>300° C.).

SUMMARY OF THE INVENTION

All of the above objects are achieved by the provision of novel polyimides which are based on the reaction of an asymmetric amide diamine with a hexafluoroisopropylidene dianhydride. These polyimides form tough, flexible films, coatings, and moldings. Glass transition temperatures ranged from 300° to 365° C., and crystalline melt temperatures were observed between 543° and 603° C. Several of these films were shown to be semicrystalline as evidenced by wide angle x-ray scattering (WAXS) and differential scanning calorimetry (DSC). These polyimide films have greater solubility in polar solvents and less color than state-of-the-art polyimides. At 25° C. tensile strength, tensile modulus, and elongation at break averaged 16.3 Ksi, 506.8 Ksi, and 4.58%, respectively. Mechanical properties at 204° C. were also good. Thermooxidative stability of the new polyimide films was as good or better than state-of-the-art polyimides. Several of these polyimides were prepared as powders and molded at temperatures of 350° to 375° C.

The excellent physical, chemical, and electrical properties of the polyimides of the present invention render them capable of being used commerically as adhesives, laminating resins, fibers, coatings for electrical and decorative purposes, films, wire enamels, and molding compounds.

DESCRIPTION OF THE PREFERRED EMBODIMENTS

According to the present invention, polymerizations were conducted at room temperature in amide solvents such as N,N-dimethylacetamide at 15 percent solids using purified monomers consistent with the following reaction scheme:

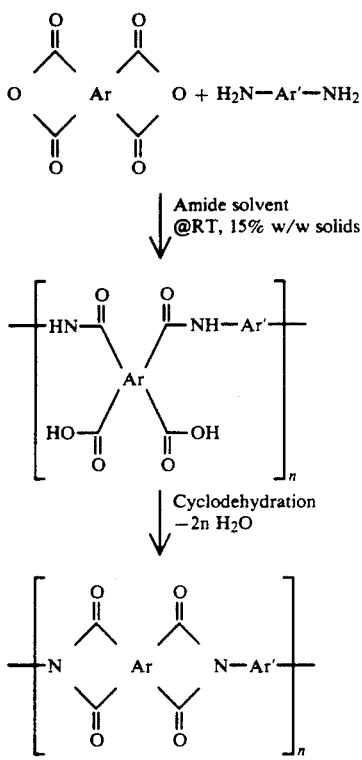

where n is an integer from 10–150 repeat units. Ar includes, but is not limited to

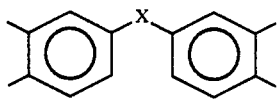

wherein X is nil or is selected from, but not limited to the following group:

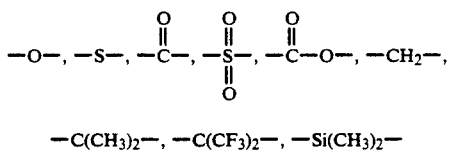

and Ar' is an aromatic asymmetric radical having the structural formula:

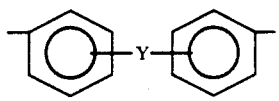

wherein Y is a radical from the group consisting of:

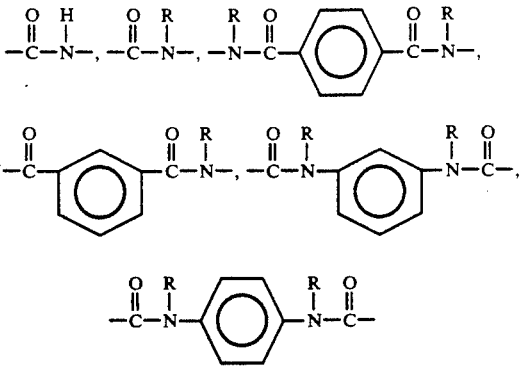

wherein R is H, an alkyl group such as methyl, an aryl group such as phenyl, and mixtures thereof.

A diamine solution was prepared in a solvent such as DMAc. The dianhydride was then added as a solid in one single portion at room temperature to form a polyamide-acid. Cyclodehydration was accomplished chemically or by heating the intermediate polyamide-acid at temperatures exceeding 200° C. As noted in the examples below, the polyimides were usually prepared in the form of solvent cast films. Although DMAc was used as the solvent medium to prepare the polyamide-acid solutions in the examples set forth below, other solvents could be used such as N,N dimethylformamide (DMF), N-methylpyrrolidinone (NMP), and 2-methoxyethyl ether (diglyme). These would also produce high quality polyimides.

SPECIFIC EXAMPLES

Example 1

A solution of 3,3'-diaminobenzanilide (3,3'-DABA) (4.545 g, 0.02 mol) in N,N dimethylacetamide (DMAc) (76.10 g) was prepared in a closed vessel. 2,2-Bis(3,4-dicarboxyphenyl)hexafluoropropane dianhydride (6FDA) (8.885 g, 0.02 mol) was added as a solid in a single portion, and the solution stirred at room temperature overnight. The inherent viscosity of the resulting polyamide-acid solution (15% solids, w/w) was 1.41 dL/g at 35° C. in DMAc. The polyamide-acid solution was solvent cast onto plate glass and allowed to air dry overnight. The coating on glass was then thermally imidized by curing one hour each at 100°, 200° and 300° C. in a forced-air oven. The resulting clear, lily-white polyimide film (approximately 1.0 mil thick) was flexible and creasable and was determined by differential scanning calorimetry (DSC) to have a glass transition temperature (Tg) of 300° C. and a weak crystalline melt transition (Tm) at 543° C. The film as cured on glass was determined by wide angle x-ray scattering to be amorphous. Dynamic thermogravimetric analysis (TGA) indicated a five percent weight loss at 440° C. and twenty percent weight loss at 520° C. in air. Isothermal weight loss after 500 hours in air at 300° C. was 2.9 percent. Tensile strength, tensile modulus, and elongation at break of this film were determined to be 16,900 psi, 460,000 psi, and 4.7%, respectively at 25° C. The imidized film was insoluble in approximately one percent refluxing methylene chloride ($CH_2Cl_2$) and soluble in refluxing m-cresol. However, the film was soluble in ambient DMAc and NMP at the same concentration. Titanium to titanium tensile shear specimens were fabricated at 343° C. under 300 psi pressure. Tensile shear strength was 1290 psi at 25° C. and failures were predominantly cohesive. Polymer powder was obtained by precipitating polyamide-acid solution in distilled water, filtering, drying, and curing one hour at 100°, 200° and 300° C. in a forced-air oven. One gram of imidized material was placed in a steel mold under 1000 psi pressure at 350° C. for one hour to produce a one in² disc molding, 0.045 inches in thickness. The Tg of the translucent molding as determined by thermomechanical analysis (TMA) was 298° C.

EXAMPLE 2

A solution of 4,4'-diaminobenzanilide (4,4'-DABA) (4.545 g, 0.02 mol) was prepared by heating in 76.10 g of DMAc in a closed vessel. 6FDA (8.885 g, 0.02 mol) was added as a solid in a single portion, and the solution was stirred at room temperature overnight. The inherent viscosity of the resulting polyamide-acid solution (15% solids, w/w) was 1.53 dL/g at 35° C. in DMAc. The polyamide-acid solution was solvent cast onto plate glass and allowed to air dry overnight. The coating on glass was then thermally imidized by curing one hour each at 100°, 200° and 300° C. in a forced-air oven. The resulting pale yellow polyimide film (approx. 1.0 mil thick) was flexible, creasable, and was determined by DSC to have a Tg of 365° C. and a strong Tm at 603° C. The film as cured on glass was determined by WAXS to be semicrystalline. Dynamic TGA indicated a five percent weight loss at 464° C. and twenty percent weight loss at 511° C. in air. Isothermal weight loss after 500 hours in air at 300° C. was 5.3 percent. Tensile strength, tensile modulus, and elongation at break of this film were determined to be 15,700 psi, 553,600 psi, and 4.5%, respectively at 25° C. The imidized film was insoluble in approximately one percent refluxing $CH_2Cl_2$. However, the film was soluble in ambient DMAc and NMP at the same concentration. Titanium to titanium tensile shear specimens were fabricated at 343° C. under 300 psi pressure. Tensile shear strength was 626 psi at 25° C. and failures were predominantly cohesive. Polymer powder was obtained by precipitating polyamide-acid solution in distilled water, filtering, drying, and curing one hour at 100°, 200°, and 300° C. in a forced-air oven. One gram of imidized material was placed in a steel mold under 1000 psi pressure at 375° C. for one hour to produce a one in² disc molding, 0.046 inches in thickness. The Tg of the translucent molding as determined by TMA was 352° C.

EXAMPLE 3

A solution of 4,4'-diamino-N-methylbenzanilide (4,4'-DANMBA) (2.413 g, 0.01 mol) in DMAc (38.85 g) was prepared. 6FDA (4.436 g, 0.01 mol) was added as a solid in a single portion, and the solution stirred overnight at room temperature. The inherent viscosity of the resulting polyamide-acid solution (15% solids, w/w) was 0.56 dL/g at 35° C. in DMAc. The polyamide-acid solution was solvent cast onto plate glass allowed to air dry overnight. The coating on glass was then thermally imidized by air curing one hour each at 100°, 200° and 300° C. The resulting pale yellow polyimide film (approximately 1.0 mil thick) was flexible and creasable, but contained imperfections. The film had a Tg of 317° C. and a Tm of 595° C. by DSC. The film as cured on glass was determined by WAXS to be semicrystalline. Dynamic TGA indicated a five percent weight loss at 455° C. and twenty percent weight loss at 524° C. in air. Isothermal weight loss after 500 hours in air at 300° C. was 6.8 percent. The imidized film was soluble in approx. one percent ambient DMAc, NMP, $CH_2Cl_2$ and m-cresol.

EXAMPLE 4

Polyamide-acid solutions of Examples 1-3 were solvent cast onto soda lime glass plate using a 13-16 mil doctor blade. The coating was allowed to air dry in a low humidity, dust-free chamber until tack-free. The coating was then removed intact from the plate glass by prying the edge up with a razor blade and soaking in warm tap water until loose. The dried coating was generally 1-2 mils in thickness, clear, light yellow, flexible, strong, and tack-free.

EXAMPLE 5

Polyamide-acid solutions of Examples 1-3 were spread evenly onto soda lime plate glass using a 13-16 mil doctor blade. The sheets were allowed to air dry horizontally in a low humidity, dust-free chamber at room temperature. The tack-free coatings on glass were cured one hour each at 100°, 200° and 300° C. in a forced-air oven. The fully imidized films were stripped from the glass plates by soaking in warm tap water and prying the edge up with a razor blade if necessary. The polyimide films, which were approximately 1 mil thick, were very flexible, strong, creasable, clear, and stable on storage.

The present invention has been described above in considerable detail. However, as is understood by those of skill in the art, variation and modifications in this detail may be effected without any departure from the spirit and scope of the present invention, as defined in the hereto-appended claims.

What is claimed is:

1. A high performance, thermooxidatively stable polyimide prepared by reacting 2,2-bis(3,4-dicarboxyphenyl)hexafluoropropane dianhydride and an asymmetric amide diamine in an amide solvent to form a polyamide-acid, followed by cyclizing the polyamide-acid to form the corresponding polyimide, wherein the asymmetric amide diamine is a member selected from the group consisting of:

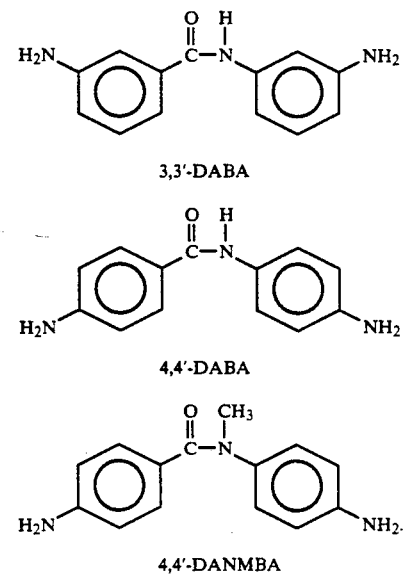

2. A polyimide according to claim 1, having repeating units of

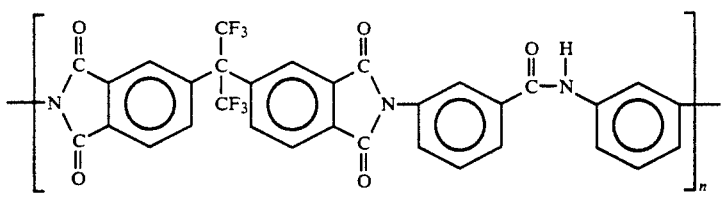

where n is an integer between 10 and 150.

3. A polyimide according to claim 1, having repeating units of

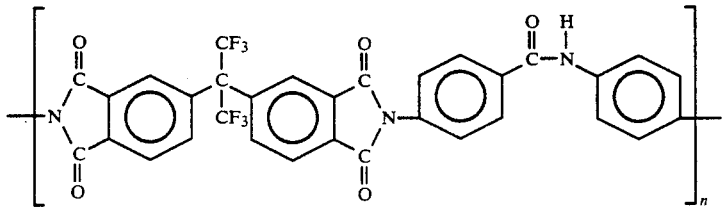

where n is an integer between 10 and 150.

4. A polyimide according to claim 1, having repeating units of

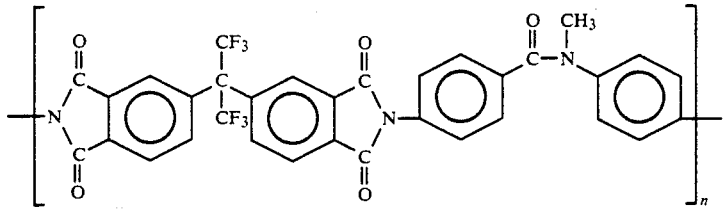

where n is an integer between 10 and 150.

5. A continuous, stable coating of a substrate prepared from a polyimide according to claim 1.

6. A creasable, free-standing film prepared from a polyimide according to claim 1.

7. A fully cured film having enhanced solubility in common organic solvents, said film being prepared from a polyimide according to claim 1.

8. An optically transparent polyimide film prepared from a polyimide according to claim 1, having high glass transition temperatures of over 300° C.

9. A metal substrate adhesive prepared from a polyimide according to claim 1.

10. A semi-crystalline film prepared from a polyimide according to claim 1.

11. A well consolidated molding prepared from a polyimide according to claim 1.

* * * * *